H. A. SELAH.
RECORDING ATTACHMENT FOR METERS.
APPLICATION FILED DEC. 1, 1909.
1,060,139.
Patented Apr. 29, 1913.
2 SHEETS—SHEET 2.
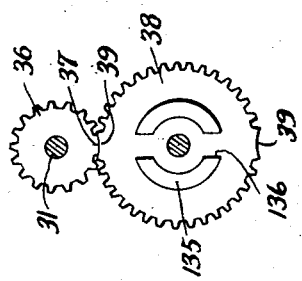
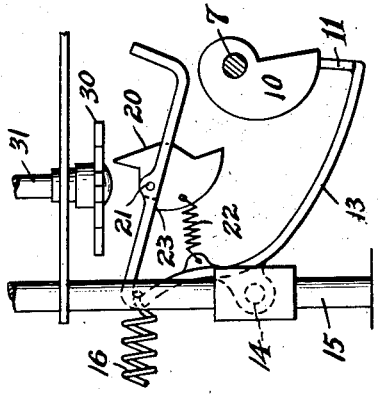
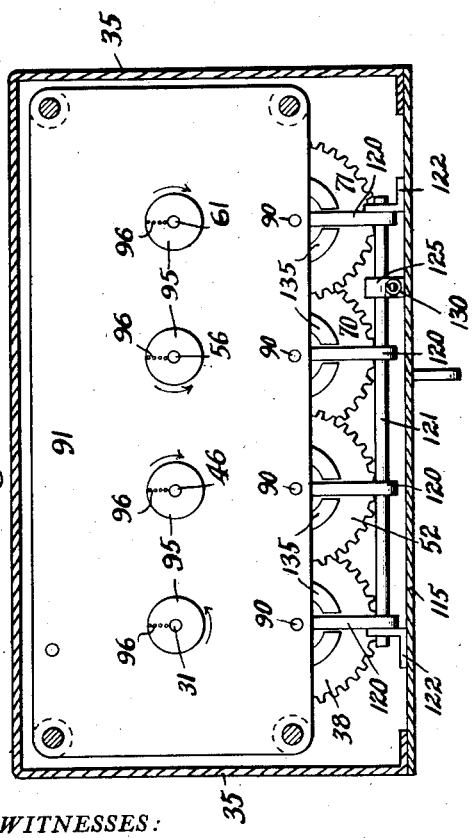
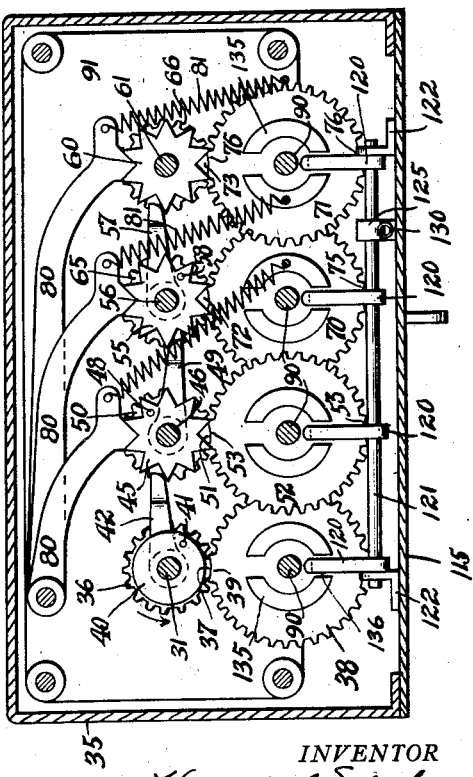
WITNESSES:
INVENTOR
Howard A. Selah
BY Cyrus N. Anderson
ATTORNEY.

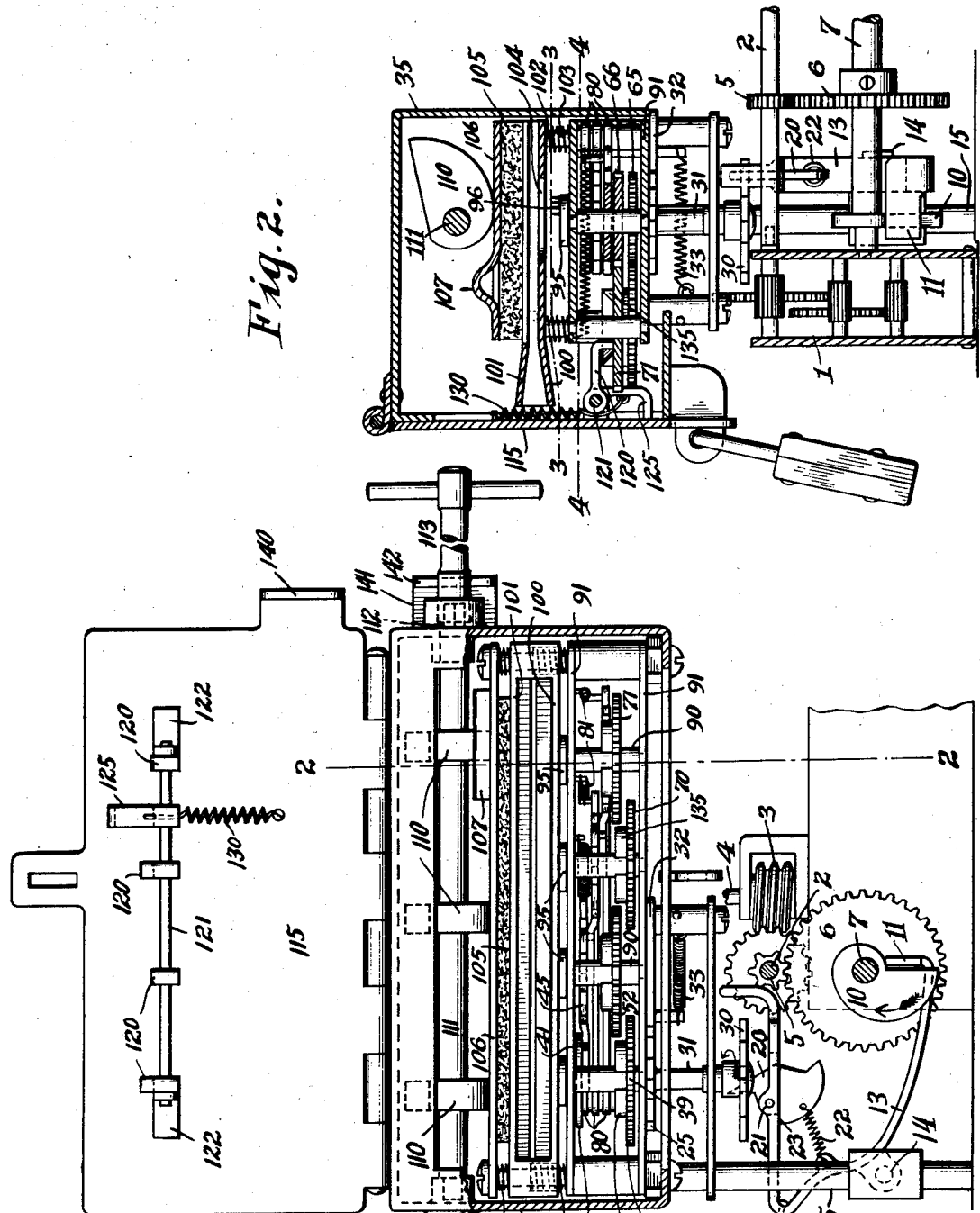

UNITED STATES PATENT OFFICE.

HOWARD A. SELAH, OF PHILADELPHIA, PENNSYLVANIA, ASSIGNOR OF ONE-HALF TO JAMES McLINDEN AND ONE-FOURTH TO CHARLES F. SANDERS, OF NORTH WILDWOOD, NEW JERSEY, AND ONE-EIGHTH TO WILLIAM McFADDEN, OF PHILADELPHIA, PENNSYLVANIA.

RECORDING ATTACHMENT FOR METERS.

1,060,139.      Specification of Letters Patent.      Patented Apr. 29, 1913.

Application filed December 1, 1909. Serial No. 530,736.

*To all whom it may concern:*

Be it known that I, HOWARD A. SELAH, a citizen of the United States, residing in Philadelphia, county of Philadelphia, State of Pennsylvania, have invented certain new and useful Improvements in Recording Attachments for Meters, of which the following is a specification.

My invention relates to improvements in recording attachments for meters, and it has for its object to provide a construction which may be readily adapted and applied to meters for measuring gas now in common use.

A further object is to provide means whereby at the expiration of any period a record may be taken showing both the quantity and the price of the gas which has been passed through the meter during such period.

A further object is to provide means for setting the parts of the said recording attachment to zero after a reading has been taken therefrom so that at the expiration of any period thereafter a record taken from the said device would indicate the amount and value of the gas which has passed through the meter subsequent to the taking of the last record therefrom.

A still further object of my invention is to provide means for preventing access to the operative parts of the attachment except when a door for the opening and closing of the casing is opened. By this means I prevent manipulation of the said attachment except at such times as the said door may be opened.

Further objects and advantages of my invention will become apparent as the description of the same advances.

In order that the principle of my invention may be readily understood and comprehended, I have illustrated one embodiment of the same in the accompanying drawings to which reference is to be had.

In said drawings:—Figure 1 is a sectional front elevation of a recording attachment for meters embodying my invention, the door for opening and closing the casing being opened and portions of the dial mechanism of a meter shown in Fig. 2 being omitted; Fig. 2 is a transverse section on the line 2—2 of Fig. 1, the door being shown in closed position and a portion of the dial mechanism of the meter being shown; Fig. 3 is a horizontal sectional view taken on the line 3—3 of Fig. 2; Fig. 4 is a horizontal sectional view taken on the line 4—4 of Fig. 2; Fig. 5 is a plan of a couple of gears, a plurality of which couples are employed in the mechanism of my attachment; and Fig. 6 is a view showing a portion of the actuating mechanism in different position from that shown in Fig. 1.

In the drawings:—1 designates a portion of the usual recording or dial mechanism from which the readings are taken for the purpose of ascertaining the quantity of gas which has passed through a meter. The said mechanism is operated by means of a shaft 2 which is driven from or by a gear wheel 3 which is secured to a shaft 4, revolution of which is caused by the flow of the gas through the meter in a known manner. For the purpose of actuating the mechanism of my new attachment, I have placed upon the shaft 2 a pinion 5 which is adapted to engage with and drive a gear 6 mounted on a counter shaft 7 supported in any manner in suitable bearings upon the meter structure. The counter shaft 7 is provided with a cam 10 which rotates with the said shaft and is adapted to engage one end 11 of a bent lever 13 pivoted at 14 upon any suitable member or support as, for instance, a supporting post or column 15 which in the construction shown constitutes a part of the support of the casing for the mechanism of my recording attachment. The bent lever 13 is held normally in the position shown in Fig. 1 of the drawings by means of a spring 16 which is attached to any suitable portion of the structure.

20 designates an actuating catch member pivoted at 21 to a portion of the lever 13 upon the opposite side of the pivot 14 from the end 11. The member 20 is held in upright position, as indicated in Fig. 1 of the drawings, by means of a spring 22 which is connected to the said member and to a portion of the lever 13. The member 20 is permitted to move pivotally in one direction but is prevented from moving about its pivot in the opposite direction by reason of the contact of the shoulder 23 against the lever adjacent to its pivot 21. Depression of the end 11 of the lever 13 by means of the cam 10 causes downward movement and also a movement to the right of the member 20 (reference being had to Fig. 1 of the drawings), the inclined surface thereof striking against the edges of the teeth on the star wheel 30 so that the member 20 is moved about its pivot and passes under and from one side to the other of the said teeth successively.

The relation of the cam 10 to the lever 13 is such that immediately after the actuating member 20 has passed one of the teeth upon the star wheel 30 the said cam releases the end 11 and permits it to snap back to its normal position as indicated in Fig. 1. In doing so the member 20 is carried to the left in Fig. 1 and causes a partial rotation of the star wheel 30 and the shaft 31 on which the said wheel is mounted in the direction indicated by the arrow. A lever 32 held against and in engagement with the star wheel 25 by a spring 33 prevents rotation of the said star wheel due to its momentum, beyond the distance between any two teeth. The shaft 31 extends into the casing 35 of my attachment and is provided with a gear wheel 36 provided with a section 37 on its periphery from which the teeth of the gear are omitted. The gear wheel 36 is adapted to engage a gear 38 having two spaces or sections 39 from which the teeth are omitted, the edge of the said spaces being slightly concaved and being adapted to engage the convexed surface of the space 37. The shaft 31 is provided with a disk 40 having a pin 41 adapted to engage an arm 42 loosely mounted on the shaft 31 and cause rotation thereof as the shaft 31 is rotated. The arm 42 is adapted to engage once during each complete rotation one of the teeth of a star wheel 45 mounted on a shaft 46 revolubly supported within the casing 35 and cause a partial revolution of the said star wheel and the said shaft. The said star wheel 45 is provided with a pin or lug 48 which is adapted to contact with an arm 49 loosely mounted on the shaft 46 and cause rotation thereof. Also mounted rigidly upon the shaft 46 is a gear 50 having a section 51 on its periphery from which the teeth have been omitted. The edge of the said section is convexed as shown. The teeth on the gear 50 are adapted to engage the teeth upon the gear 52 for the purpose of driving the same. The periphery of the gear 52 is provided with two diametrically opposed concaved sections 53. The arm 49 once during each complete rotation contacts with one of the teeth of the star wheel 55 and occasions a partial revolution thereof. The star wheel 55 is supported upon a shaft 56 upon which is loosely mounted an arm 57 rotation of which is adapted to be caused by contact therewith of a pin or projection 58 on the said star wheel.

Once during each complete revolution of the arm 57 it contacts with one of the teeth of a star wheel 60 rigidly secured to the shaft 61 and causes a partial revolution thereof. Gear wheels 65 and 66 are respectively rigidly secured to the shafts 56 and 61. The said gears are adapted to mesh with gear teeth upon the gear wheels 70 and 71. The peripheries of the gear wheels 65 and 66 are respectively provided with convex sections 72 and 73 from which the teeth are omitted, while the gear wheels 70 and 71 are respectively provided with two concaved sections 75 and 76 which are without teeth.

When the concaved sections on the peripheries of the gears 38, 52, etc. are brought into contact with the convexed blank sections on the peripheries of the gear wheels 36, 50, 65 and 66, the said gears 38, 52, etc. are locked against further rotation, but the gear wheels 36, 50, 65 and 66 are not locked and may be rotated at any time. In order to prevent the star wheels 45, 55 and 60 and the various parts connected thereto from rotating a greater distance than that of one tooth when actuated by one or the other of the arms 42, 49 and 57, I have provided the holding dogs 80 having projections which are adapted to engage the said star wheels, the said holding dogs being held against the said star wheels by means of springs 81. The wheels 38, 52, 70 and 71 are provided for the purpose of turning the respective gear wheels with which they are respectively associated and the parts connected to the said gear wheels into zero position. Whenever the blank spaces upon the periphery of the gear wheels 36, 50, 65 and 66 are in contact with or adjacent to either of the blank spaces upon the respective wheels 38, 52, 70 and 71, the parts are at zero position. I have provided upon each of the positioning wheels 38, 52, 70 and 71 two blank spaces so that at no time will it be necessary to turn any one of the said positioning wheels through a greater distance than half a revolution in order to bring the associated gear wheels 36, 50, 65 and 66 and the parts connected thereto into zero position. The wheels 38, 52, etc. are supported upon shafts 90 which are revolubly supported in plates 91. The shafts 46, 56, and 61 are also supported by the said plates. The shafts 31, 46, 56 and 61 are provided with disks 95 each of which is provided with pins 96 which are adapted to pierce a paper or other sheet having figures and other data thereon so arranged that the piercing of the same will indicate both the quantity and the value of the gas which has passed through the meter during any period of time which may have elapsed since the setting of the several parts of my attachment to the zero point or position. Such a paper is illustrated and described in my copending application, filed June 9, 1909, Serial No. 501,213, and need not be described herein.

The paper or similar object on which the record is made is adapted to be inserted in the space between the plates 100 and 101. These plates are secured together, being spaced apart as indicated in Fig. 2 and are supported upon springs 102 coiled about upright bolts or posts 103. The plate 100 is provided at intervals with circular openings 104 which register or are in alinement with the disks 95 so that as the plates are depressed the said disks and the pins carried thereby pass through the said circular openings,—the pins piercing any record slip which may occupy the space between the plates 100 and 101. As an abutment or support for any record strip or sheet which may be located in the said space I have provided the part 105 which may consist of felt or other suitable material over which extends a plate 106 having an upset portion 107. Cams 110 are provided upon a shaft 111 supported in bearings at the opposite ends of the casing or box 35. By reason of the presence of the upset portion 107 adjacent one of the cams 110, the shaft 111 and the said cams 110 are prevented from complete rotation. The shaft 111 is provided with a squared end 112 which is adapted to be engaged by a key 113 for turning the said shaft.

A hinged door 115 is provided for the purpose of opening and closing one side of the casing 35. When shut the door is adapted to be locked as indicated in Fig. 2.

It is desirable that means be provided to prevent the closing of the door except when the several parts of the device are set to zero position as heretofore described. For this purpose I have provided arms 120 which are pivoted to a rod 121 carried upon the door 115. The inner ends of the arms 120 are provided with angularly bent portions 122. In order to limit movement of the arms 120 in one direction about the rod or bar 121 I have provided angular portions 125 which respectively have rigid connection with the arms 120 and the ends of which abut against the door 115. The parts 125 and the arms 120 are held in the position shown in Fig. 2 by means of springs 130. The upper sides of the respective positioning wheels 38, 52, etc., are provided with circular bead-like portions 135 which are cut away or slotted as at 136 in alinement with the concaved blank spaces or portions on the periphery of the said positioning wheels. When the several positioning wheels, 38, 52, 70 and 71 are in zero position, which is the position shown in Fig. 4 of the drawings, it will be noted that all of the slotted or cut away portions 136 are in alinement with the arms 120. If an attempt should be made to close the door 115 upon which the said arms 120 are supported and any one of the said positioning wheels and the gearing connected thereto should not occupy the zero position, the said arm would strike the periphery of one or the other of the sections of the bead-like portions 135 and the door would thus be prevented from closing. The door may be opened no matter what may be the position of the positioning wheels 38, 52, 70 and 71 by reason of the fact that the inside of the said bead-like portions is beveled as shown in Fig. 2 of the drawings and permits the portions 122 to slide thereover.

It should be noted that the number of teeth upon the gears 36, 50, 65 and 66 is equal to half the number of teeth upon the positioning gears 38, 52, 70 and 71.

The door 115 is provided with a strip of material 140 which extends rearwardly over the opening for the key 113 so as to prevent the insertion of the said key and the rotation of the shaft carrying the cams 110 except when the door 115 is open. In order to prevent the bending of the said strip of material 140 for the purpose of gaining access to the opening for the key 113 when the door is closed, I have provided a plate 141 which projects from one end of the casing 35 and has a laterally extending portion 152 which overlaps the rear end of the plate 140.

Having thus described my invention, I claim:—

1. In a recording attachment for meters, the combination of a plurality of disks carrying piercing pins, means for supporting the said disks, mechanism for causing revolution of the said supporting means, a casing for inclosing the said disks and their supports, a door for opening and closing an opening in the said casing, and means for preventing the closing of the said door except when the said disks are at zero position.

2. In a recording attachment for meters, the combination of a plurality of shafts having means carried thereby for piercing a record sheet or strip, pinions mounted on the said shaft, means interposed between the said shafts for causing step by step revolution thereof, positioning gear wheels coöperating with the said pinions, each of the said gear wheels having bead-like portions upon one side thereof, the said portions having cut-out sections in alinement with each other, a casing for inclosing the mechanism of the attachment, a door for said casing, and spring-held arms secured to the said door, the said arms being adapted to strike the said bead-like portions to prevent closing the said door except when the cut-out sections in the said portions are in alinement with the said arms.

In testimony that I claim the foregoing as my invention, I have hereunto signed my name this 22nd day of November, A. D. 1909.

HOWARD A. SELAH.

In the presence of—
 CARRIE E. KLEINFELDER,
 IRVIN SCHUPP, Jr.